(12) United States Patent
Hisada

(10) Patent No.: US 12,176,776 B2
(45) Date of Patent: Dec. 24, 2024

(54) STATOR INCLUDING COIL SEGMENTS WITH HOOK-SHAPED PORTIONS

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventor: Hideki Hisada, Kuwana Mie (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 180 days.

(21) Appl. No.: 17/929,725

(22) Filed: Sep. 5, 2022

(65) Prior Publication Data

US 2022/0416605 A1    Dec. 29, 2022

Related U.S. Application Data

(63) Continuation of application No. PCT/JP2020/009488, filed on Mar. 5, 2020.

(51) Int. Cl.
*H02K 3/28* (2006.01)
*H02K 3/48* (2006.01)
*H02K 3/50* (2006.01)

(52) U.S. Cl.
CPC .......... *H02K 3/28* (2013.01); *H02K 3/48* (2013.01); *H02K 3/50* (2013.01)

(58) Field of Classification Search
CPC .. H02K 3/04; H02K 3/12; H02K 3/14; H02K 3/28; H02K 3/46; H02K 3/50;
(Continued)

(56) References Cited

U.S. PATENT DOCUMENTS

2019/0013704 A1   1/2019  Pydin
2020/0366146 A1   11/2020  Koga et al.

FOREIGN PATENT DOCUMENTS

JP    2007-37344 A   2/2007
JP    4662141 B2     3/2011
(Continued)

OTHER PUBLICATIONS

Nakamura, Machine Translation of JP2020141528, Sep. 2009 (Year: 2009).*

(Continued)

*Primary Examiner* — Eric Johnson
(74) *Attorney, Agent, or Firm* — Finnegan, Henderson, Farabow, Garrett & Dunner, LLP

(57) ABSTRACT

According to one embodiment, a stator includes a stator core and a stator coil configured by joining a plurality of coil segments mounted in slots of the stator core. Extending portions of the coil segments include a plurality of first extending portions, an inclined portion, and a joining end portion and a hook-shaped portion provided at an extending end of the inclined portion. The joining end portions are arranged side by side in a radial direction such that distal end surfaces are located at substantially the same height, the hook-shaped portions are meshed with each other, and a first engagement surface of one of the joining end portions faces and abuts on a first engagement surface of the other of the joining end portions.

3 Claims, 11 Drawing Sheets

(58) Field of Classification Search
CPC ............... H02K 3/505; H02K 15/0056; H02K 15/0068; H02K 15/0081; H02K 15/0087; H02K 15/0414; H02K 15/0421; H02K 15/0428
See application file for complete search history.

(56) References Cited

FOREIGN PATENT DOCUMENTS

| | | | |
|---|---|---|---|
| JP | 2015-109718 A | | 6/2015 |
| JP | 2015-126643 A | | 7/2015 |
| JP | 2019-17223 A | | 1/2019 |
| JP | 2020141528 A | * | 9/2020 |
| KR | 20140083770 A | * | 7/2014 |
| WO | WO 2019/059295 A1 | | 3/2019 |

OTHER PUBLICATIONS

Cho, Machine Translation of KR20140083770, Jul. 2014 (Year: 2015).*
Japan Patent Office, International Search Report in Int'l App. No. PCT/JP2020/009488 (May 26, 2020).

* cited by examiner

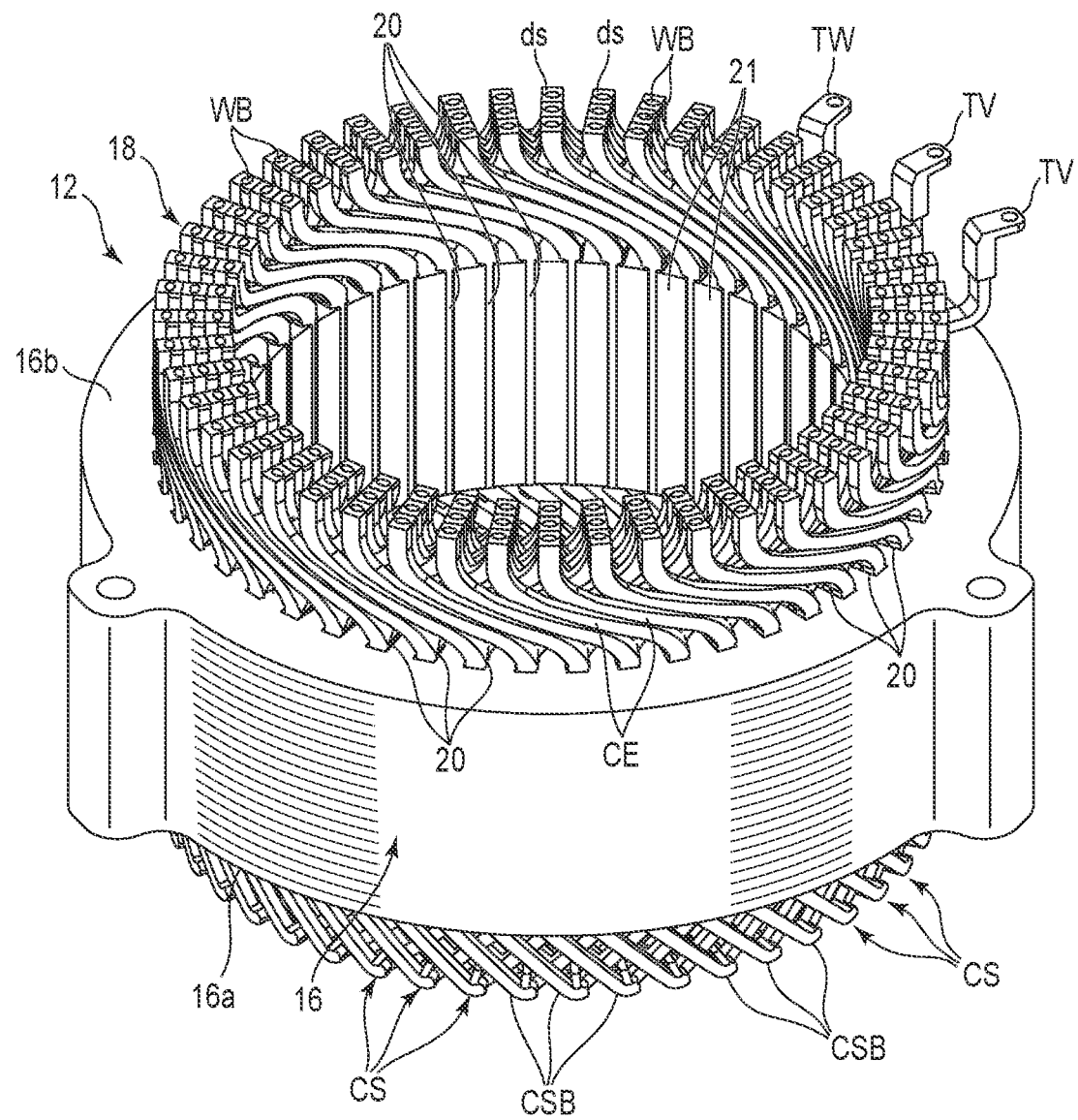
F I G. 3

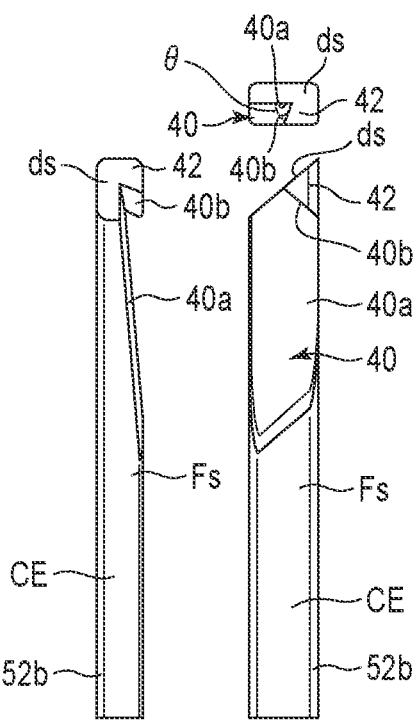
F I G. 15
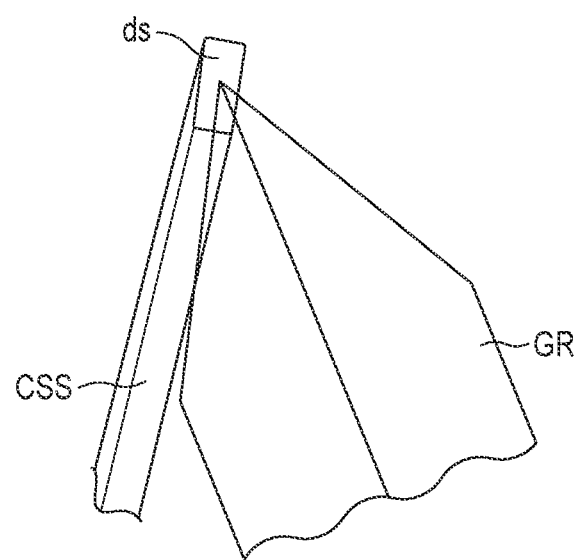
F I G. 16

STATOR INCLUDING COIL SEGMENTS WITH HOOK-SHAPED PORTIONS

CROSS-REFERENCE TO RELATED APPLICATIONS

This application is a Continuation Application of PCT Application No. PCT/JP2020/009488, filed Mar. 5, 2020, the entire contents of which are incorporated herein by reference.

FIELD

Embodiments described herein relate generally to a stator of a rotary electric machine.

BACKGROUND

Normally, a rotary electric machine comprises a cylindrical stator and a cylindrical rotor rotatably supported inside the stator. The stator includes a stator core and a coil attached to the stator core. The coil is configured by electrically and mechanically joining a plurality of coil segments made of linear conductors (conductive wires) to each other.

Generally, the linear conductor (coil segment) is shaped into a hairpin shape after coating of its tip is peeled off, and is inserted into slots of the stator core. Subsequently, after the coil segment is bent and shaped, the tip of the linear conductor is held using a jig or the like, and the tips of the adjacent coil segments are joined to each other by arc welding or laser welding.

In the coil manufacturing process described above, a highly accurate and highly rigid jig for holding the tip portions of the two coil segments is required so as not to form a gap in a welded portion. When joining is performed by laser welding, a high-power laser is required because heat diffusion is large. Furthermore, in order to ensure insulation between adjacent welded portions, additional processing such as applying insulation coating to the joining portion or bending the joining portion toward an outer peripheral side may be required.

BRIEF DESCRIPTION OF THE DRAWINGS

FIG. 3 is a perspective view illustrating a first end surface side of a stator of the rotary electric machine.

FIG. 15 is a three-view view of the extending portion of the coil segment.

FIG. 16 is a view schematically illustrating an extending end portion of the coil segment and a grindstone for notch processing.

DETAILED DESCRIPTION

Figure 1:
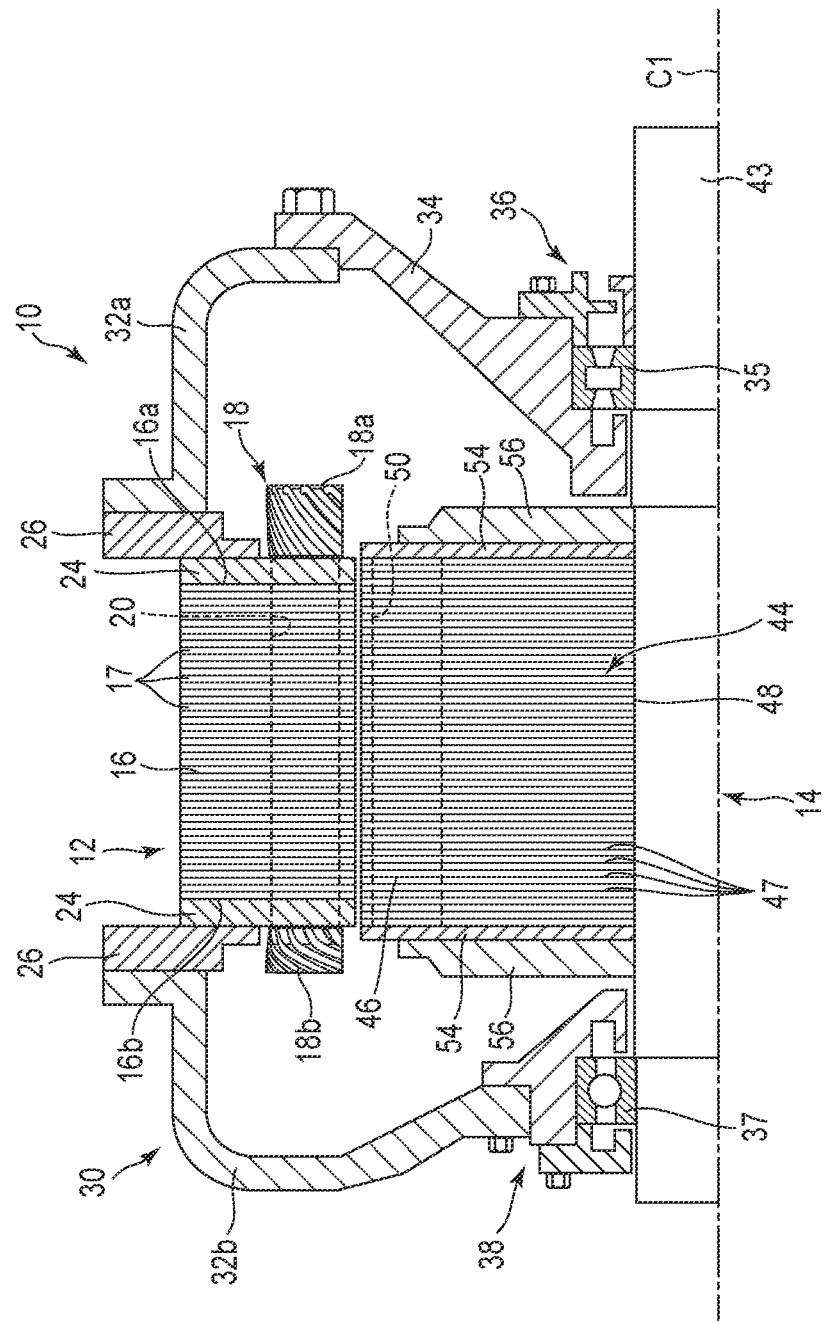
FIG. 1 is a longitudinal cross-sectional view illustrating a rotary electric machine according to a first embodiment.

Various embodiments will be described hereinafter with reference to the accompanying drawings. In general, according to one embodiment, a stator comprises: a stator core that includes a yoke having an annular shape and a plurality of teeth each extending in a radial direction from an inner periphery of the yoke and positioned side by side at intervals in a circumferential direction of the yoke, wherein a gap between a pair of teeth adjacent in the circumferential direction forms a slot; and a stator coil configured by joining a plurality of coil segments mounted in the slots. The coil segments each include a pair of linear portions arranged in different slots, a bridging portion arranged outside the stator core and connecting one ends of the pair of linear portions, an extending portion extending from the other end of the linear portion to the outside of the stator core, a joining end portion having a distal end surface formed at an extending end of the extending portion, and a hook-shaped portion formed at the joining end portion and having the distal end surface and a first engagement surface intersecting the distal end surface. The extending portions of the plurality of coil segments include: a plurality of first extending portions each including a bent portion bent in a first direction in a circumferential direction of the stator core, an inclined portion extending from the bent portion while being inclined with respect to an axial direction of the stator core, and the joining end portion and the hook-shaped portion provided at an extending end of the inclined portion, the first engagement surface facing a second direction opposite to the first direction in the circumferential direction and inclined in the first direction from one side toward a center side of the distal end surface with respect to the radial direction; and a plurality of second extending portions each including a bent portion bent in the second direction opposite to the first direction in the circumferential direction of the stator core, an inclined portion extending from the bent portion while being inclined with respect to the axial direction of the stator core, and the joining end portion and the hook-shaped portion provided at an extending end of the inclined portion, the first engagement surface of the hook-shaped portion facing the first direction opposite to the second direction in the circumferential direction and inclined in the second direction from one side to a center side of the distal end surface with respect to the radial direction. The joining end portion of the first extending portion and the joining end portion of the second extending portion are arranged side by side in the radial direction such that the distal end surfaces are located at substantially the same height, the hook-shaped portion of the first extending portion is meshed with the hook-shaped portion of the second extending portion, and the first engagement surface of one of the joining end portions faces and abuts on the first engagement surface of the other of the joining end portions.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

Figure 2:
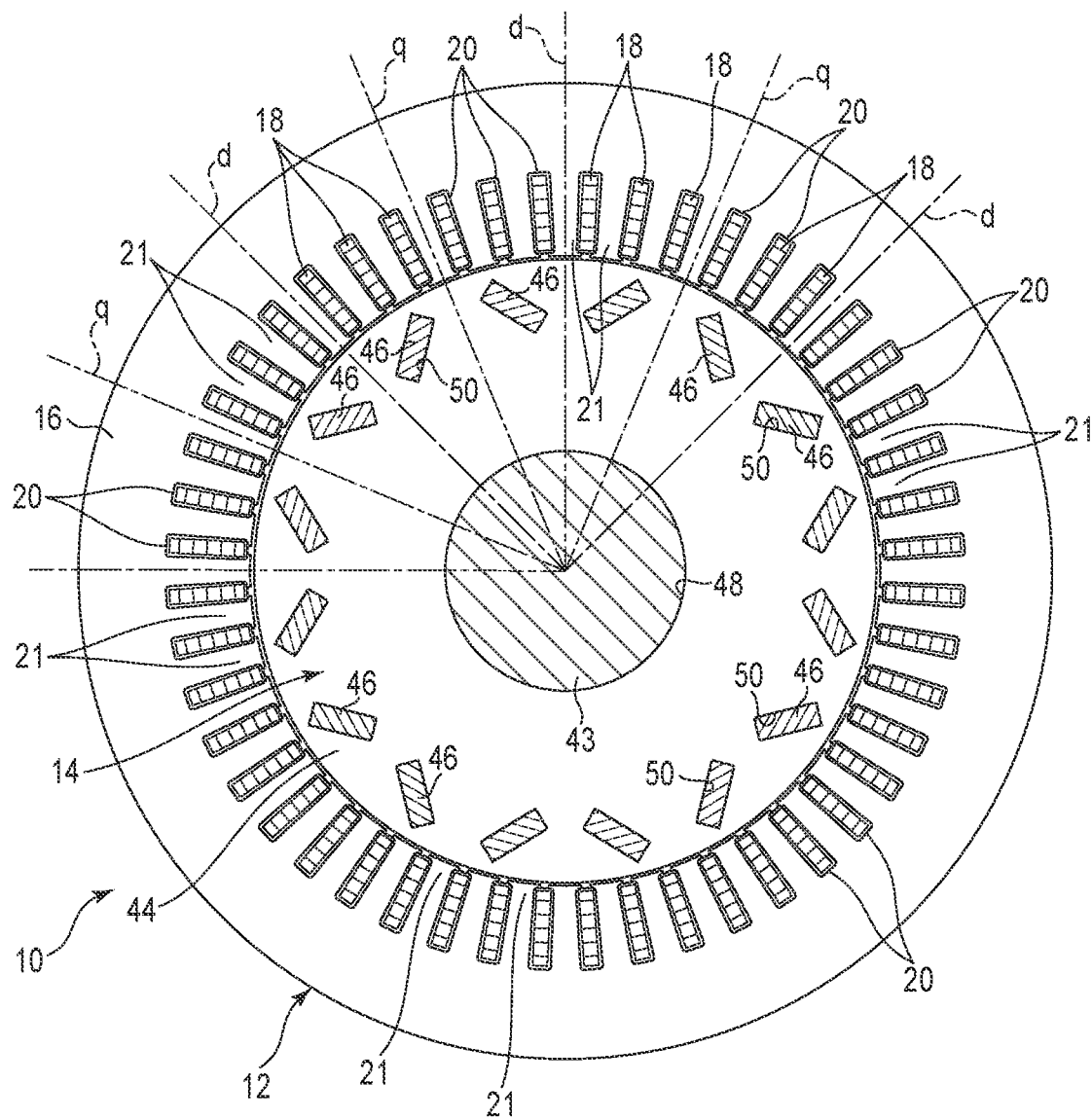
FIG. 2 is a transverse cross-sectional view of the rotary electric machine according to the first embodiment.

FIG. 1 is a longitudinal cross-sectional view of a rotary electric machine according to a first embodiment, illustrating only a half of the rotary electric machine on one side with a central axis Cl as the center. FIG. 2 is a transverse cross-sectional view of the rotary electric machine.

As illustrated in FIG. 1, a rotary electric machine 10 is configured as, for example, a permanent magnet type rotary electric machine. The rotary electric machine 10 comprises an annular or cylindrical stator 12, a rotor 14 supported inside the stator 12 so as to be rotatable about the central axis Cl and coaxially with the stator 12, and a casing 30 that supports the stator 12 and the rotor 14.

In the following description, an extending direction of the central axis Cl is referred to as an axial direction, a direction rotating about the central axis Cl is referred to as a circumferential direction, and a direction orthogonal to the axial direction and the circumferential direction is referred to as a radial direction.

As illustrated in FIGS. 1 and 2, the stator 12 includes a cylindrical stator core 16 and a stator coil (hereinafter referred to as "coil") 18 attached to the stator core 16. The stator core 16 is formed by coaxially laminating a large number of annular electromagnetic steel sheets 17 made of a magnetic material such as silicon steel. The large number of electromagnetic steel sheets 17 are connected to each other in a laminated state by welding a plurality of portions on an outer peripheral surface of the stator core 16. The stator core 16 has an inner peripheral surface located coaxially with the central axis Cl, a first end surface 16a located at one end in the axial direction, and a second end surface 16b located at the other end in the axial direction. The first end surface 16a and the second end surface 16b extend orthogonal to the central axis Cl.

A plurality of slots 20 are formed in an inner peripheral portion of the stator core 16. The plurality of slots 20 are arranged at equal intervals in the circumferential direction. In the present embodiment, each slot 20 has an inner peripheral side end opened to the inner peripheral surface of the stator core 16. Each slot 20 extends in a radiation direction (radially outward with respect to the central axis of the stator core 16) from the inner peripheral surface side of the stator core 16. Each slot 20 extends over the entire length in the axial direction of the stator core 16. Each slot 20 has one end in the axial direction open to the first end surface 16a, and the other end in the axial direction open to the second end surface 16b. Note that the inner peripheral side end of each slot 20 may be configured not to open to the inner periphery of the stator core 16, and the inner peripheral surface of the stator core 16 may have a cylindrical surface shape.

By forming the plurality of slots 20, the inner peripheral portion of the stator core 16 constitutes a plurality of (for example, in the present embodiment, 48) teeth 21 protruding toward the central axis Cl. The teeth 21 are arranged at equal intervals in the circumferential direction. As described above, the stator core 16 integrally includes an annular yoke portion, and the plurality of teeth 21 protruding in the radial direction from an inner peripheral surface of the yoke portion toward the central axis Cl. One slot 20 is formed between two teeth 21 adjacent in the circumferential direction.

The coil 18 is attached to the plurality of slots 20 and wound around each tooth 21. The coil 18 includes coil ends 18a and 18b extending outward in the axial direction from the first end surface 16a and the second end surface 16b of the stator core 16. By applying an alternating current to the coil 18, a predetermined interlinkage magnetic flux is formed in the stator 12 (teeth 21).

As illustrated in FIG. 1, two core retainers 26 are provided at both ends in the axial direction of the stator core 16. The casing 30 includes a substantially cylindrical first bracket 32a and a bowl-shaped second bracket 32b. The first and second brackets 32a and 32b are formed of, for example, an aluminum alloy or the like. The first bracket 32a is coupled to the core retainer 26 located on the drive end side of the stator core 16. An annular bearing bracket 34 is coaxially fastened to a tip side of the first bracket 32a with bolts. As a first bearing 35, for example, a first bearing housing 36 incorporating a roller bearing is fastened to a central portion of the bearing bracket 34.

The second bracket 32b is coupled to the core retainer 26 located on the non-drive end side. As a second bearing 37, for example, a second bearing housing 38 incorporating a ball bearing is fastened to a central portion of the second bracket 32b.

On the other hand, the rotor 14 includes a cylindrical shaft (rotating shaft) 43, a cylindrical rotor core 44 fixed to substantially a central portion of the shaft 43 in the axial direction, and a plurality of permanent magnets 46 embedded in the rotor core 44. Both end portions of the rotating shaft 43 in the axial direction are supported by the first bearing 35 and the second bearing 37, and are rotatably supported around the central axis Cl. The rotor core 44 is configured as a laminated body in which a large number of annular electromagnetic steel sheets 47 made of a magnetic material such as silicon steel are coaxially laminated. The rotor core 44 has an inner hole 48 formed coaxially with the central axis Cl. The rotating shaft 43 is inserted and fitted into the inner hole 48 and extends coaxially with the rotor core 44. Two substantially disk-shaped magnetic shielding plates 54 and two rotor core retainers 56 are provided at both ends in the axial direction of the rotor core 44.

As illustrated in FIGS. 1 and 2, the rotor core 44 is coaxially arranged inside the stator core 16 with a slight gap (air gap). That is, an outer peripheral surface of the rotor core 44 faces the inner peripheral surface of the stator core 16 (distal end surfaces of the teeth 21) with a slight gap.

A plurality of magnet embedding holes 50 penetrating the rotor core 44 in the axial direction are formed in the rotor core 44. A permanent magnet 46 is loaded and arranged in each magnet embedding hole 50, and is fixed to the rotor core 44 with, for example, an adhesive or the like. Each permanent magnet 46 extends over the entire length of the rotor core 44. The plurality of permanent magnets 46 are arranged at predetermined intervals in the circumferential direction of the rotor core 44.

As illustrated in FIG. 2, the rotor core 44 has d-axes extending in the radial direction or the radiation direction of the rotor core 44, and q-axes electrically separated from the d-axis by 90° in the circumferential direction. Here, an axis extending in the radiation direction through a boundary between adjacent magnetic poles and the central axis Cl is defined as a q-axis, and a direction electrically perpendicular to the q-axis is defined as a d-axis. The d-axis and the q-axis are alternately provided in the circumferential direction of the rotor core 44 at a predetermined phase.

Two magnet embedding holes 50 are formed on both sides of each d-axis in the circumferential direction of the rotor core 44, and permanent magnets 46 are loaded in these embedding holes 50. Each of the embedding holes 50 and the permanent magnets 46 has a substantially rectangular cross-sectional shape and is inclined with respect to the d-axis. When viewed in a plane orthogonal to the central axis Cl of the rotor core 44, the two embedding holes 50 and permanent magnets 46 are arranged side by side in a substantially V-shape opened toward the outer periphery, for example.

The two permanent magnets 46 located on both sides in the circumferential direction of the d-axis are arranged such that the magnetization directions are opposite to each other in the circumferential direction of the rotor core 44, and the two permanent magnets 46 located on both sides in the circumferential direction of the q-axis are arranged such that the magnetization directions are the same. By arranging the plurality of permanent magnets 46 as described above, a region on each d-axis is formed around one magnetic pole in the outer peripheral portion of the rotor core 44. In the present embodiment, the rotary electric machine 10 constitutes a permanent magnet embedded type rotary electric machine in which front and back of the N pole and the S pole of the permanent magnet 46 are alternately arranged for each adjacent magnetic pole, and the winding is performed by single layer distributed winding with 8 poles (4 pole pairs) and 48 slots.

Next, the configuration of the stator 12 will be described in detail.

Figure 4:
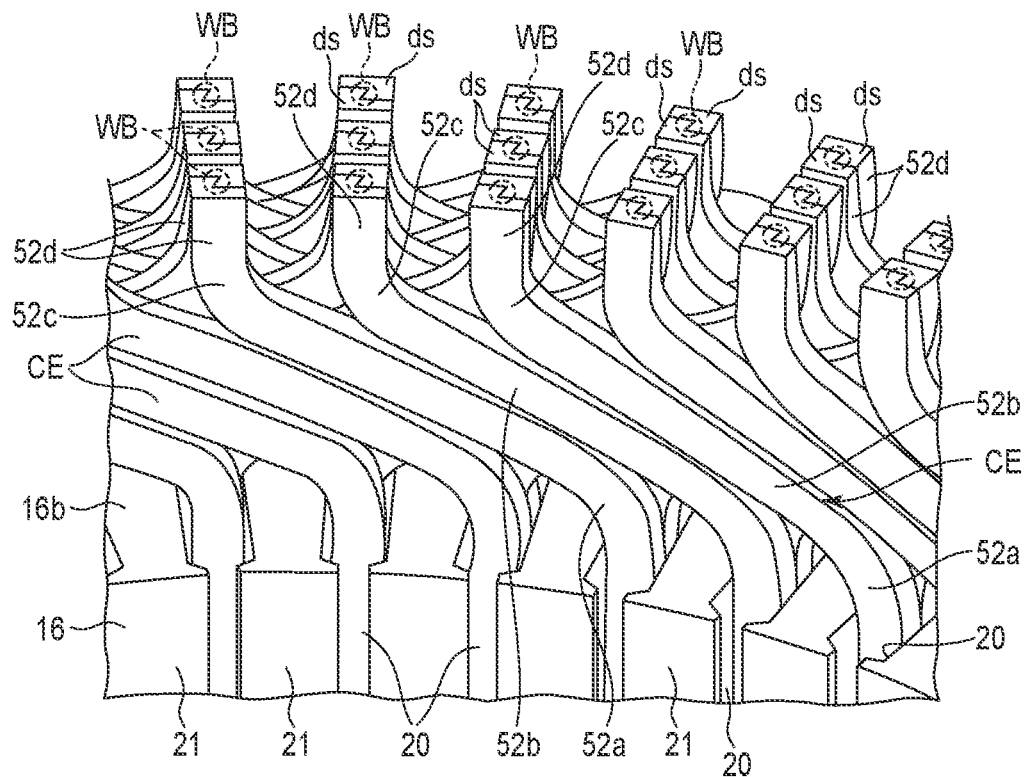
FIG. 4 is an enlarged perspective view illustrating a part of a coil end of the stator.
Figure 5:
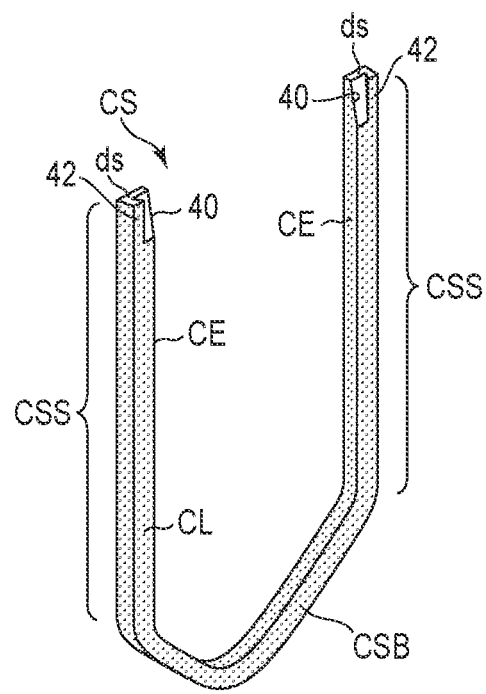
FIG. 5 is a plan view illustrating a coil segment constituting the coil of the stator.

FIG. 3 is a perspective view illustrating the second end surface side of the stator, FIG. 4 is an enlarged perspective view illustrating a part of the coil end of the stator coil, and FIG. 5 is a perspective view illustrating an example of a coil segment.

The coil 18 is configured using, for example, a plurality of coil segments CS made of a rectangular conductor (rectangular wire) as a linear conductor, and is assembled to the stator core 16.

As illustrated in FIG. 5, the coil segment CS is formed in a substantially U-shape by cutting and bending a rectangular wire. That is, the coil segment CS integrally includes a pair of linear portions CSS facing each other with a space therebetween, and a bridging portion CSB connecting one end portions of the linear portions CSS. The coil segment CS has a substantially rectangular cross section (transverse section) perpendicular to the longitudinal direction. That is, the transverse section has a pair of long sides L1 facing each other and a pair of short sides S1 facing each other (see FIG. 6). An outer surface of the coil segment CS is covered with an insulating coating CL such as an insulating varnish. An extending end of each linear portion CSS is cut in a direction orthogonal to the longitudinal direction to form a rectangular distal end surface (joining surface) ds substantially orthogonal to the longitudinal direction. A notch 40 is formed at one corner portion in an extending end portion (joining end portion) of the linear portion CSS. The notch 40 is open to two intersecting side surfaces and the joining surface ds at the corner portion. Inner surfaces (a first engagement surface and a second engagement surface) of the notch 40 and the joining surface ds are not covered with an insulating coating, and form a conductive portion capable of conducting. By providing the notch 40 as described above, the remaining portion of the joining end portion forms a hook-shaped portion (hook) 42 having the joining surface ds, a first engagement surface 40b, and a first facing surface FS to be described later. Detailed shapes and configurations of the notch 40 and the hook-shaped portion 42 will be described later.

In a case where the transverse section of the linear conductor is rectangular, the four corners do not need to be at right angles, and may be chamfered or rounded. Further, in a case where the transverse section has two opposing long sides, the transverse section may be an oval shape or the like in which a portion connecting ends of the two opposing long sides is a curve. Furthermore, the conductor is not limited to a rectangular conductor, and a conductor having a circular or elliptical transverse section may also be used.

As illustrated in FIGS. 3 and 4, in the plurality of coil segments CS, a pair of linear portions CSS is inserted into different slots 20 from the first end surface 16a side of the stator core 16, for example, and protrudes from the second end surface 16b of the stator core 16 by a predetermined length. Each linear portion CSS forms an insertion portion arranged in the slot 20 and an extending portion CE extending from the slot 20 to the outside of the stator core 16.

Figure 6:
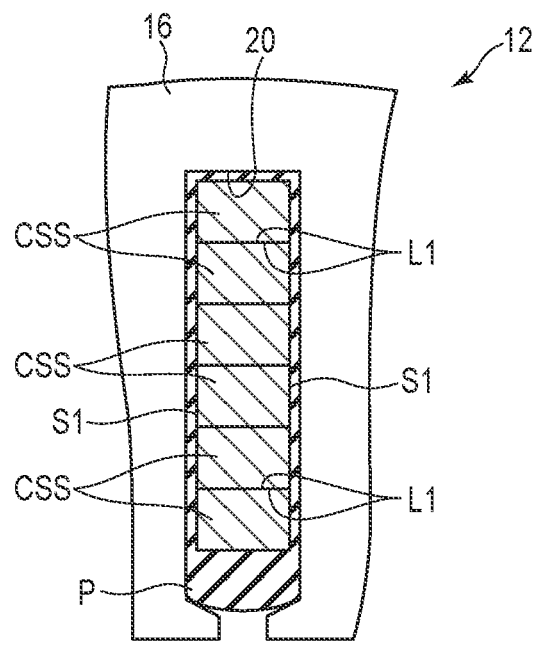
FIG. 6 is an enlarged cross-sectional view illustrating one slot of the stator.

FIG. 6 is a cross-sectional view of one slot of the stator core 16. As illustrated in the drawing, for example, the linear portions CSS of six coil segments CS are inserted into one slot 20. In the slot 20, the six linear portions CSS are arranged side by side in the radial direction of the stator core 16. When viewed in a transverse section, the six linear portions CSS are arranged in the slot 20 in a state where the long sides L1 face each other in parallel. An insulating material, such as an insulating paper P, is wound around outer surfaces of the six linear portions CSS, and the linear portions CSS are inserted into the slot 20 together with the insulating paper P. Note that the insulating paper P may be inserted into the slot 20 in advance, and the coil 18 may be inserted in a state where the insulating paper P is arranged in the slot 20. The insulating paper P electrically insulates the coil 18 from the outside and physically protects the coil 18.

As illustrated in FIG. 3, the bridging portion CSB of the coil segment CS is arranged outside the stator core 16 and faces the first end surface 16a of the stator core 16 with a slight gap. The bridging portion CSB extends substantially along the circumferential direction of the stator core 16, and some bridging portions CSB extend while crossing other bridging portions CSB. These bridging portions CSB constitute the coil end 18a protruding from the first end surface 16a.

As illustrated in FIGS. 3 and 4, on the second end surface 16b side of the stator core 16, the extending portion CE of the linear portion CSS protruding in the axial direction from the second end surface 16b is bent in the circumferential direction of the stator core 16 and extends inclined with respect to the axial direction. Further, the extending end portion of the extending portion CE is bent in the axial direction to form a second linear portion extending in the axial direction. As described above, each of the extending portions CE integrally includes a first bent portion (a bent portion) 52a that is bent at an angle in the circumferential direction from the axial direction of the stator core 16, an inclined portion 52b that linearly extends from the first bent portion 52a while being inclined with respect to the axial direction, a second bent portion 52c that is bent in the axial direction from an extending end of the inclined portion 52b, and a second linear portion (the joining end portion) 52d that linearly extends from the second bent portion 52c in the axial direction of the stator core 16.

The extending portions CE of the six linear portions CSS inserted into each slot 20 are alternately bent in one direction and in the opposite direction. That is, the extending portion CE located on an outermost periphery is bent in one direction in the circumferential direction of the stator core 16, and the extending portion CE located one step inward from the outermost periphery is bent in the other direction (the opposite direction) in the circumferential direction. The extending portion CE located one more step inward is bent in the one direction, and the extending portion CE located further one more step inward is bent in the opposite direction. The joining end portions 52d of the six extending portions CE extending from different slots 20 are positioned in substantially a row in the radial direction of the stator core 16. Distal end surfaces of the joining end portions 52d, i.e., the joining surfaces ds, are located at substantially the same height with respect to the end surface 16b of the stator core 16, are arranged side by side in a row along the radial direction of the stator core 16, and extend substantially on the same plane.

Two joining end portions 52d adjacent to each other in the radial direction are engaged with and connected to each other by meshing the hook-shaped portions 42 described above with each other. The joining surfaces ds of the six joining end portions 52d of each row are welded to each other two by two (two pieces by two pieces) so as to be mechanically and electrically joined. For example, laser welding can be used for the welding. Two joining surfaces ds adjacent to each other in the radial direction are irradiated with a laser beam to partially melt the joining surfaces ds and the joining end portions 52d, thereby forming a weld bead WB extending over the two joining surfaces ds. Each welded portion or joined portion is covered with an insulating material such as powder coating, varnish or the like. Three coils are formed by the plurality of coil segments CS joined to each other in this manner. The extending portion CE of the coil segment CS constitutes the coil end 18b protruding from the second end surface 16b. A U-phase connection terminal TU, a V-phase connection terminal TV, and a W-phase connection terminal TW are connected to the three coils 18, respectively.

Next, shapes and configurations of the joining end portion 52d, the notch 40, and the hook-shaped portion 42 will be described in detail.

Figure 7:
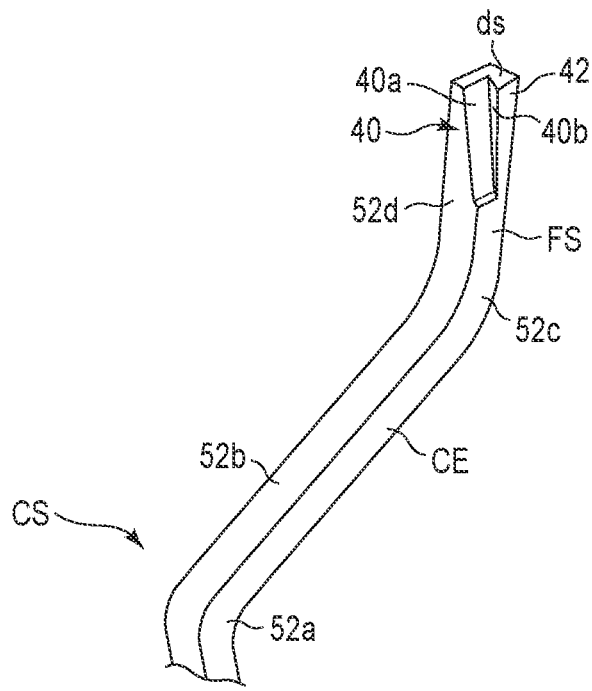
FIG. 7 is a perspective view illustrating an extending portion of the coil segment.
Figure 8:
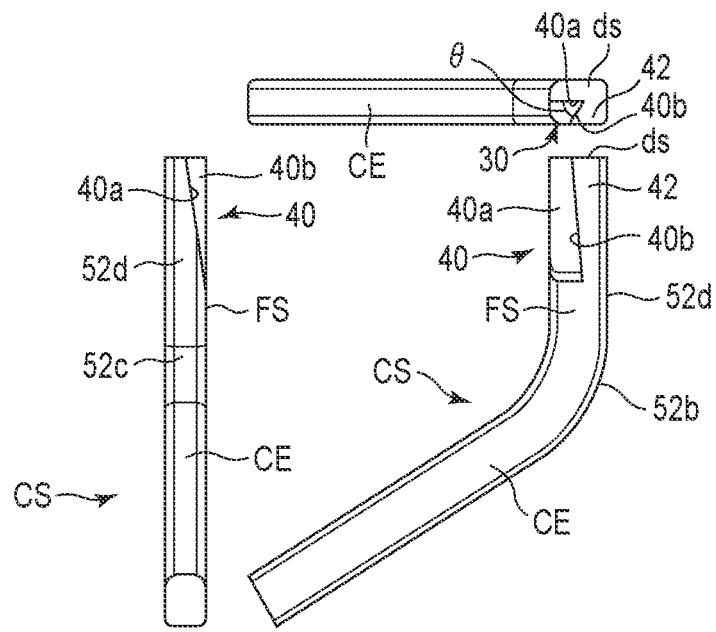
FIG. 8 is a three-view view of the extending portion of the coil segment.
Figure 9:
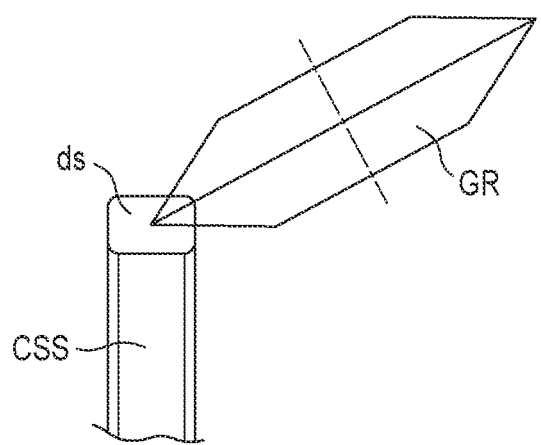
FIG. 9 is a view schematically illustrating an example of the extending end portion of the coil segment and a grindstone for notch processing.
Figure 10:
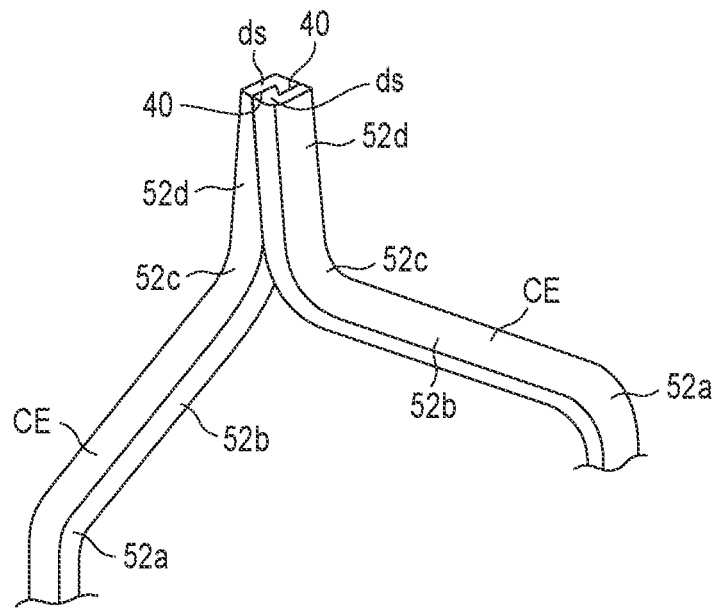
FIG. 10 is a perspective view of the coil segment illustrating a state in which joining end portions of two coil segments adjacent to each other in a radial direction are engaged with each other.
Figure 11:
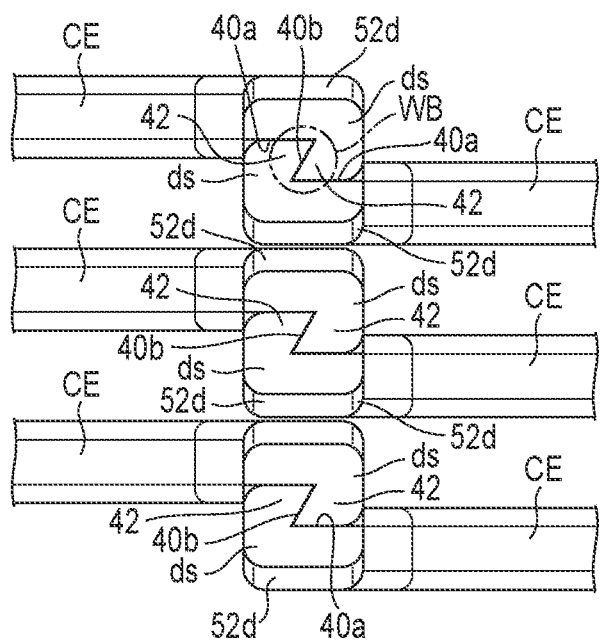
FIG. 11 is a plan view illustrating joining portions of the coil segments arranged in a radial direction.

FIG. 7 is a perspective view illustrating the extending portion of the coil segment, FIG. 8 is a three-view view of the extending portion, FIG. 9 is a view schematically illustrating an example of the extending end portion of the coil segment and a grindstone for notch processing, FIG. 10 is a perspective view illustrating two connected extending portions, and FIG. 11 is a plan view illustrating six extending portions connected two by two.

As illustrated in FIGS. 7 and 8, each extending portion CE of the coil segment CS integrally includes the first bent portion 52a curved in the circumferential direction of the stator core 16, the inclined portion 52b extending from the first bent portion 52a so as to be inclined with respect to the axial direction of the stator core, the second bent portion 52c bent in the axial direction from the extending end of the inclined portion 52b, and the second linear portion (the joining end portion) 52d linearly extending from the second bent portion 52c in the axial direction of the stator core 16. The distal end surface of the joining end portion 52d forms the joining surface ds.

One corner portion of the joining end portion 52d is cut to form the notch 40. By forming the notch 40, the remaining portion of the joining end portion 52d forms the hook-shaped portion (hook) 42. The notch 40 is formed to open in the first facing surface FS of the joining end portion 52d (a side surface facing the other joining end portion 52d), another side surface intersecting the first facing surface FS, and the joining surface ds. The notch 40 has the first engagement surface 40b and the second engagement surface 40a respectively extending from a middle portion of the joining end portion 52d in the longitudinal direction to the joining surface ds, and the first engagement surface 40b and the second engagement surface 40a intersect each other so as to form an opening angle θ of 90° or less.

The first engagement surface 40b constituting a part of the hook-shaped portion 42 extends from a central portion in the width direction of the joining surface ds to the first facing surface FS so as to be inclined with respect to the width direction of the joining end portion 52d. The second engagement surface 40a faces the other joining end portion 52d to be joined, and is inclined from the first facing surface FS toward a central axis side 3 of the joining end portion 52d.

The first engagement surface 40b extends from a central portion of the joining surface ds in the longitudinal direction to a middle portion of the first facing surface FS along one side edge of the second engagement surface 40a. The first engagement surface 40b faces the first bent portion 52a of the extending portion CE, i.e., faces a direction substantially opposite to a bending direction of the first bent portion 52a. An angle formed by the first engagement surface 40b and the second engagement surface 40a is set to 90° or less. In the joining surface ds, the second engagement surface 40a extends in the longitudinal direction of the joining surface ds, and the first engagement surface 40b extends in the width direction of the joining surface ds (the radial direction of the stator core) or in an inclined manner toward the first bent portion 52a than in the width direction.

Note that, as schematically illustrated in FIG. 9, the notch 40 and the hook-shaped portion 42 described above can be formed, for example, by partially grinding the extending end portion of the linear portion CSS with a V-shaped grindstone GR.

As illustrated in FIGS. 10 and 11, the two joining end portions 52d adjacent to each other in the radial direction are engaged with and connected to each other by meshing the hook-shaped portions 42 with each other. That is, the hook-shaped portion 42 of one joining end portion 52d is engaged with the notch 40 of the other joining end portion 52d. The first engagement surface 40b of one hook-shaped portion 42 faces and abuts on the first engagement surface 40b of the other hook-shaped portion 42, and the first facing surface FS of one hook-shaped portion 42 faces and engages with the second engagement surface 40a of the other joining end portion 52d. At this time, the two hook-shaped portions 42 are biased in a direction in which the first engagement surfaces 40b mesh with (abut on) each other by a restoring force (spring back) generated after the bending of the first bent portions 52a. As a result, the joining end portions 52d of the two extending portions CE are firmly connected, and the first engagement surfaces 40b are in close contact with each other with substantially no gap therebetween. At the same time, the joining surface ds of the one joining end portion 52d and the joining surface ds of the other joining end portion 52d are arranged flush with each other with substantially no gap. In the laser welding, by irradiating the vicinity of the boundary of the first engagement surfaces 40b on the joining surfaces ds with a laser beam, the joining surfaces ds and the first engagement surfaces 40b are welded or, in other words, joined with each other.

As described above, since the two joining end portions 52d can be connected to each other with no gap therebetween, it is not necessary to hold the two joining end portions by a highly accurate and highly rigid jig or the like at the time of welding, so that manufacturability of the stator is improved.

Further, the first facing surface FS of each hook-shaped portion 42 is pressed against the inclined second engagement surface 40a of the other joining end portion 52d, whereby the two joining end portions 52d are connected in a state where the one joining end portion 52d is slightly elastically deformed toward the other joining end portion 52d. Therefore, a gap can be provided between the three pairs of joining end portions arranged in the radial direction, and the insulation between the three pairs of joining end portions can be improved. At the same time, bending of the joining end portion for providing such a gap becomes unnecessary, so that manufacturability of the stator is further improved.

In the joining portion to be welded, the insulating coating CL of the rectangular wire is removed only on the joining surface ds, and the first engagement surface 40b and second engagement surface 40a of the notch 40 to make a conductive state; however, the periphery of the joining end portion 52d and the first facing surface FS are covered with the insulating coating CL. In a case where the insulating coating CL remains in the vicinity of the welded portion as described above, diffusion of heat is hindered during welding, so that welding can be performed with an inexpensive low-power laser. Furthermore, external forces such as vibration are reduced from being directly applied to the welded portion, so that reliability of welding is improved.

As described above, according to the present embodiment, it is possible to obtain a stator of a rotary electric machine capable of reducing manufacturing cost and improving manufacturability.

Next, a stator of a rotary electric machine according to other embodiments will be described. Note that, in other embodiments described below, the same parts as those of the first embodiment described above are denoted by the same reference numerals, detailed description thereof is omitted or simplified, and parts different from those of the first embodiment will be mainly described in detail.

Second Embodiment

Figure 12:
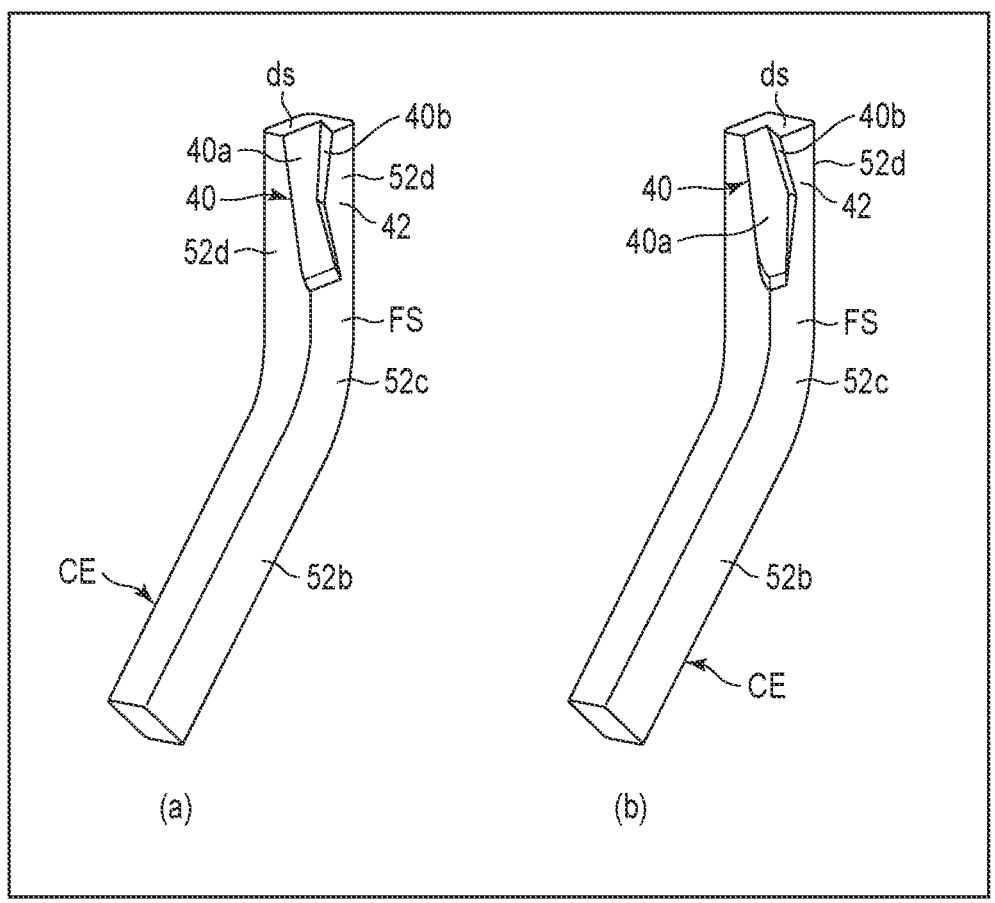
FIG. 12 is a perspective view illustrating an extending end portion of a coil segment of a rotary electric machine according to a second embodiment.

FIG. 12 is a perspective view illustrating an extending portion of a coil segment of a stator according to a second embodiment.

As shown in FIG. 12(a), in the second embodiment, in a hook-shaped portion 42 formed at one joining end portion 52d of two joining end portions 52d connected and joined to each other, a first engagement surface 40b has a plurality of inclined surfaces bent such that a central portion in the axial direction is convex in a direction intersecting the axial direction. That is, the first engagement surface 40b has a first inclined surface inclined in a first bent portion 52a from a joining surface ds toward a proximal end side and a second inclined surface inclined in a direction opposite to the first bent portion 52a from the first inclined surface to a proximal end of a notch 40.

As shown in FIG. 12(b), in the hook-shaped portion 42 formed at the other joining end portion 52d, the first engagement surface 40b is bent such that a central portion in the axial direction is concave in a direction intersecting the axial direction. That is, the first engagement surface 40b has a first inclined surface inclined in a direction opposite to the first bent portion 52a from the joining surface ds toward the proximal end side, and a second inclined surface inclined in the first bent portion 52a side from the first inclined surface to the proximal end of the notch 40.

When two joining end portions 52d and hook-shaped portions 42 are connected to each other, as in the first embodiment described above, the two joining end portions 52d are biased in a direction in which the first engagement surfaces 40b mesh with each other by a restoring force (spring back) generated after the bending of the first bent portions 52a. The two joining end portions 52d are firmly connected, and the first engagement surfaces 40b are in close contact with each other with substantially no gap therebetween. At this time, the first engagement surface 40b bent in a convex shape and the first engagement surface 40b bent in a concave shape abut on and are fitted to each other, whereby the displacement of the two joining end portions 52d in the axial direction (vertical direction) is regulated and the two joining end portions 52d are positioned at a predetermined height position. Accordingly, the heights of the joining surfaces ds of the two joining end portions 52d can be made uniform. By making the heights of the joining surfaces ds uniform, laser welding can be performed more easily and reliably.

Third Embodiment

Figure 13:
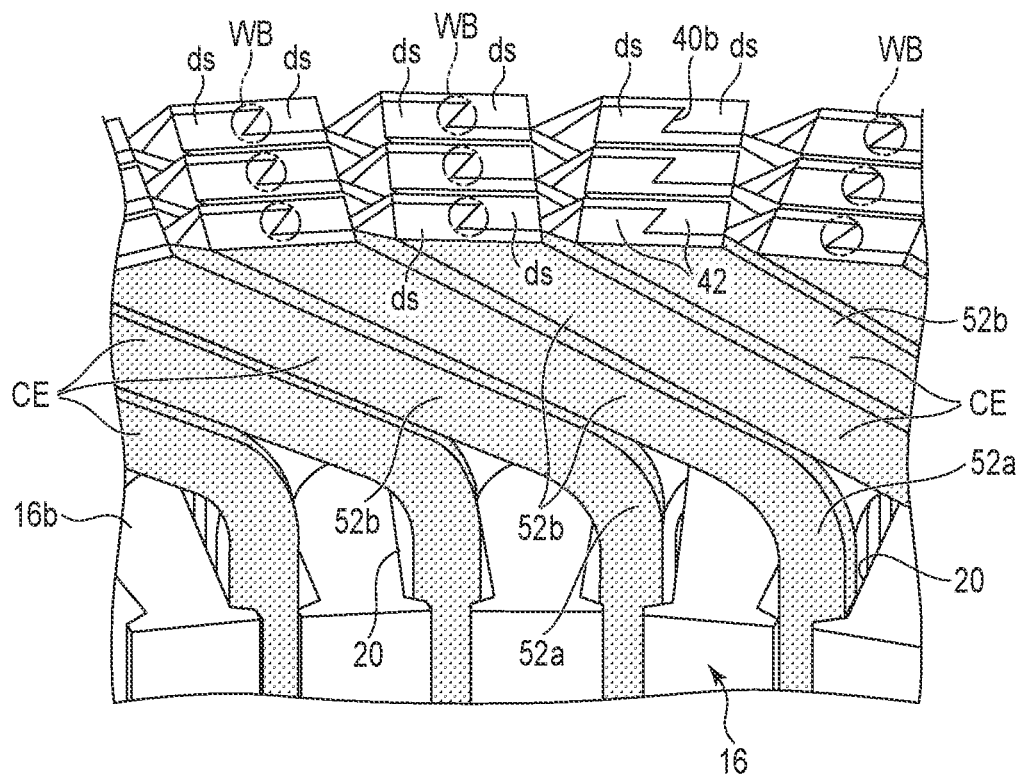
FIG. 13 is an enlarged perspective view illustrating a part of a coil end of a rotary electric machine according to a third embodiment.
Figure 14:
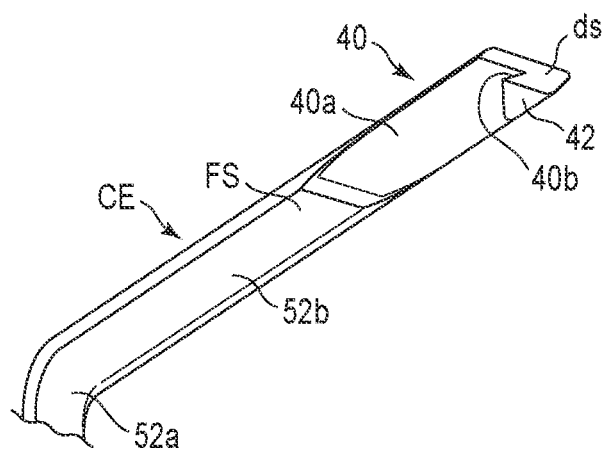
FIG. 14 is a perspective view illustrating an extending portion of a coil segment in the third embodiment.
Figure 17:
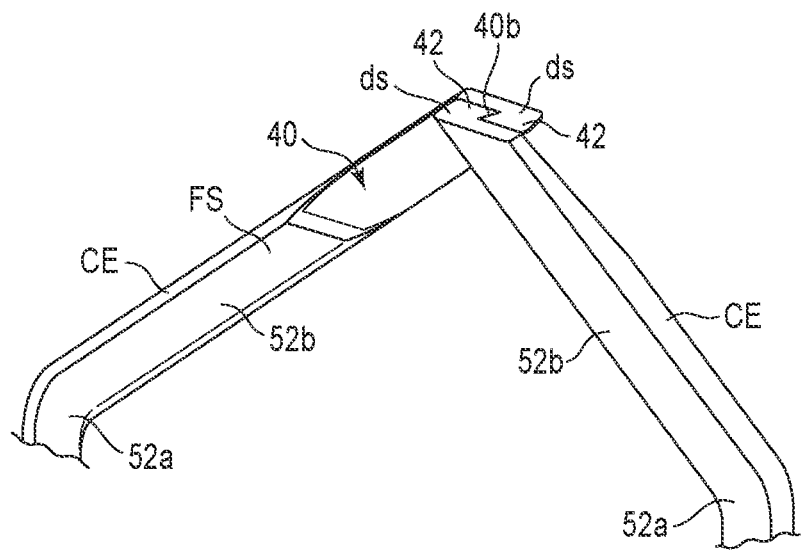
FIG. 17 is a perspective view of the coil segment illustrating a state in which joining end portions of two coil segments adjacent to each other in a radial direction are engaged with each other.

FIG. 13 is an enlarged perspective view illustrating a part of a coil end of a stator according to a third embodiment, FIG. 14 is a perspective view illustrating an extending portion of a coil segment of the stator according to the third embodiment, FIG. 15 is a three-view view of the extending portion, FIG. 16 is a view schematically illustrating an example of an extending end portion of the coil segment and a grindstone for notch processing, and FIG. 17 is a perspective view illustrating a state in which two extending portions adjacent to each other in a radial direction are engaged and connected.

As illustrated in FIG. 13, in the third embodiment, a distal end of each extending portion CE of a coil segment CS is cut obliquely with respect to the longitudinal direction. As a result, the extending portion CE has a joining surface (a distal end surface) ds inclined with respect to the longitudinal direction. On a second end surface 16b side of a stator core 16, the extending portion CE protruding from the second end surface 16b has a first bent portion 52a bent in the circumferential direction from the axial direction of the stator core 16, an inclined portion 52b linearly extending from the first bent portion 52a while being inclined with respect to the axial direction, and the joining surface ds formed at an extending end of the inclined portion 52b. The first bent portion 52a is bent such that the joining surface ds is positioned substantially parallel to the second end surface 16b of the stator core 16. A distal end portion of the inclined portion 52b constitutes a joining end portion.

The extending portions CE of the six linear portions CSS inserted into each slot 20 are alternately bent in one direction and in the opposite direction. That is, the extending portion CE located on an outermost periphery is bent in one direction in the circumferential direction of the stator core 16, and the extending portion CE located one step inward from the outermost periphery is bent in the other direction (the opposite direction) in the circumferential direction. The extending portion CE located one more step inward is bent in the one direction, and the extending portion CE located further one more step inward is bent in the opposite direction. The distal end surfaces of the six extending portions CE extending from different slots 20, i.e., the joining surfaces ds, are positioned in substantially a row along the radial direction of the stator core 16 and extend in substantially the same plane.

As illustrated in FIGS. 14 and 15, a notch 40 and a hook-shaped portion 42 are formed at the joining end portion of the extending portion CE. The notch 40 is formed by partially cutting a first facing surface FS and the joining surface ds of the joining end portion. The notch 40 has a first engagement surface 40b and a second engagement surface 40a extending from a middle portion of a joining end portion 52d in the longitudinal direction to the joining surface ds, and the first engagement surface 40b and the second engagement surface 40a intersect each other so as to form an opening angle θ of 90° or less.

The second engagement surface 40a extends from a central portion in the width direction of the joining surface ds to the first facing surface FS so as to be inclined with respect to the axial direction of the extending portion CE. The second engagement surface 40a faces the other joining end portion to be joined, and is inclined from the first facing surface FS toward a central axis side of the extending portion CE.

The first engagement surface 40b extends from a central portion of the joining surface ds in the longitudinal direction to a middle portion of the first facing surface FS. The first engagement surface 40b faces the first bent portion 52a of the extending portion CE, i.e., faces a direction substantially opposite to a bending direction of the first bent portion 52a. An angle formed by the second engagement surface 40a and the first engagement surface 40b is set to 90° or less. In the joining surface ds, the second engagement surface 40a extends in the longitudinal direction of the joining surface ds, and the first engagement surface 40b extends in the width direction of the joining surface ds or in an inclined manner toward the first bent portion 52a than the width direction.

By providing the notch 40 as described above, the joining end portion of the extending portion CE forms a claw-like hook-shaped portion (hook) 42 having the joining surface ds, the first engagement surface 40b, and the first facing surface FS. Note that, as schematically illustrated in FIG. 16, the above-described notch 40 can be formed, for example, by grinding the extending end portion of the linear portion CSS with a V-shaped grindstone GR.

As illustrated in FIGS. 13 and 16, the joining end portions of two extending portions CE adjacent to each other in the radial direction are engaged with and connected to each other by meshing the hook-shaped portions 42 with each other. That is, the hook-shaped portion 42 of one joining end portion is engaged with the notch 40 of the other joining end portion. The first engagement surface 40b of one hook-shaped portion 42 faces and abuts on the first engagement surface 40b of the other hook-shaped portion 42, and the first facing surface FS of one hook-shaped portion 42 faces and engages with the second engagement surface 40a of the other joining end portion. At this time, the two joining end portions are biased in a direction in which the first engagement surfaces 40b mesh with each other by a restoring force (spring back) generated after the bending of the first bent portions 52a. As a result, the joining end portions of the two extending portions CE are firmly connected to each other, and the first engagement surfaces 40b are in close contact with each other with substantially no gap therebetween. At the same time, the joining surface ds of one joining end portion and the joining surface ds of the other joining end portion are positioned at substantially the same height and are arranged flush with each other with substantially no gap.

In the laser welding, by irradiating the vicinity of the boundary of the first engagement surfaces 40b on the joining surfaces ds with a laser beam, the joining surfaces ds and the first engagement surfaces 40b are welded and joined.

As described above, since the two joining end portions of the coil segment can be connected to each other with no gap therebetween, it is not necessary to hold the two joining end portions by a highly accurate and highly rigid jig or the like at the time of welding, so that manufacturability is improved. In addition, in the third embodiment, the same functional effects as those of the first embodiment described above can be obtained. Further, in the third embodiment, since the extending portion CE of the coil segment does not have the second linear portion, the height of the coil end can be reduced, so that the stator can be downsized.

Fourth Embodiment

Figure 18:
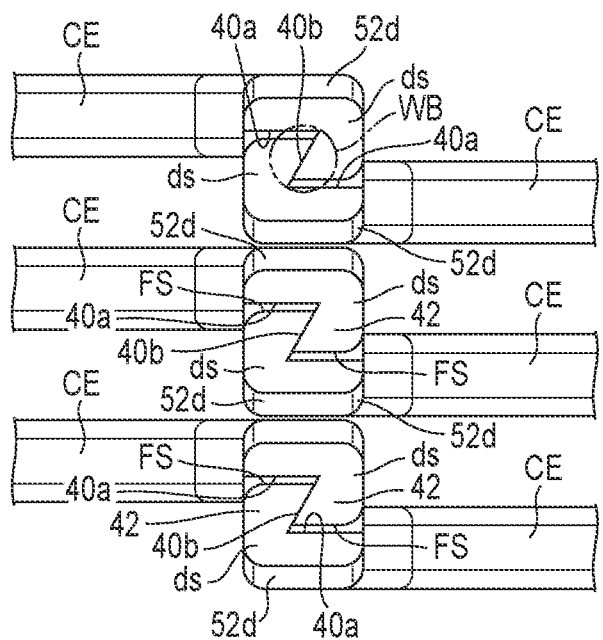
FIG. 18 is a plan view illustrating joining portions of coil segments arranged in a radial direction in a rotary electric machine according to a fourth embodiment.

FIG. 18 is a plan view illustrating a joining portion of coil segments arranged in a radial direction in a rotary electric machine according to a fourth embodiment.

According to the present embodiment, a second engagement surface 40a of each notch 40 provided in a joining end portion 52d of the coil segment is formed to have a small inclination angle with respect to the axial direction, or formed substantially parallel to the axial direction. Two joining end portions 52d adjacent to each other in the radial direction are engaged with and joined to each other by meshing hook-shaped portions 42 with each other. A first engagement surface 40b of one hook-shaped portion 42 faces and abuts on the first engagement surface 40b of the other hook-shaped portion 42. At this time, the two joining end portions 52d are biased in a direction in which the first engagement surfaces 40b mesh with each other, and the first engagement surfaces 40b are in close contact with each other with substantially no gap therebetween.

The first facing surface FS of one hook-shaped portion 42 faces the second engagement surface 40a of the other joining end portion 52d with a gap therebetween. At the same time, the joining surface ds of the one joining end portion 52d and the joining surface ds of the other joining end portion 52d are arranged, in the portion of the first engagement surface 40b, flush with each other with no gap therebetween. In the laser welding, by irradiating the vicinity of the boundary of the first engagement surfaces 40b on the joining surfaces ds with a laser beam, the joining surfaces ds and the first engagement surfaces 40b are welded.

As described above, there may be a gap between the second engagement surface 40a and the first facing surface FS, and a stable joining portion can be obtained if the first engagement surfaces 40b are joined in close contact with each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of turns of the coil and the number of coil segments are not limited to the above-described embodiments, and can be appropriately increased or decreased. For example, four or eight segment linear portions may be arranged in one slot. Dimensions, materials, shapes, and the like of the stator are not limited to the above-described embodiments, and can be variously changed according to the design. The stator and the rotary electric machine according to the present embodiment can be applied not only to a permanent magnet type rotary electric machine but also to an induction motor.

What is claimed is:

1. A stator comprising:
a stator core that includes a yoke having an annular shape and a plurality of teeth each extending in a radial direction from an inner periphery of the yoke and positioned side by side at intervals in a circumferential direction of the yoke, wherein a gap between a pair of teeth adjacent in the circumferential direction forms a slot; and
a stator coil configured by joining a plurality of coil segments mounted in the slots,
wherein the coil segments each include a pair of linear portions arranged in different slots, a bridging portion arranged outside the stator core and connecting one ends of the pair of linear portions, an extending portion extending from the other end of the linear portion to the outside of the stator core, a joining end portion having a distal end surface formed at an extending end of the extending portion, and a hook-shaped portion formed at the joining end portion and having the distal end surface and a first engagement surface intersecting the distal end surface, and
the extending portions of the plurality of coil segments include:
a plurality of first extending portions each including a bent portion bent in a first direction in a circumferential direction of the stator core, an inclined portion extending from the bent portion while being inclined with respect to an axial direction of the stator core, and the joining end portion and the hook-shaped portion provided at an extending end of the inclined portion, the first engagement surface facing a second direction opposite to the first direction in the circumferential direction and inclined in the first direction from one side toward a center side of the distal end surface with respect to the radial direction; and
a plurality of second extending portions each including a bent portion bent in the second direction opposite to the first direction in the circumferential direction of the stator core, an inclined portion extending from the bent portion while being inclined with respect to the axial direction of the stator core, and the joining end portion and the hook-shaped portion provided at an extending end of the inclined portion, the first engagement surface of the hook-shaped portion facing the first direction opposite to the second direction in the circumferential direction and inclined in the second direction from one side to a center side of the distal end surface with respect to the radial direction, and
the joining end portion of the first extending portion and the joining end portion of the second extending portion are arranged side by side in the radial direction such that the distal end surfaces are located at substantially the same height, the hook-shaped portion of the first extending portion is meshed with the hook-shaped portion of the second extending portion, and the first engagement surface of one of the joining end portions faces and abuts on the first engagement surface of the other of the joining end portions.

2. The stator according to claim 1, wherein
the hook-shaped portion has a notch formed of the first engagement surface and a second engagement surface intersecting the first engagement surface and the distal end surface and facing the radial direction, and
the second engagement surface is inclined in the radial direction with respect to the axial direction of the stator core, and is arranged to intersect the first engagement surface at an opening angle of 90° or less.

3. The stator according to claim 1, wherein the first engagement surface of one hook-shaped portion of the hook-shaped portion of the first extending portion and the hook-shaped portion of the second extending portion is formed of a plurality of inclined surfaces or curved surfaces that are convex in a direction intersecting the axial direction of the stator core, and the first engagement surface of the other hook-shaped portion is formed of a plurality of inclined surfaces or curved surfaces that are concave in the direction intersecting the axial direction, and is fitted to the convex first engagement surface.

* * * * *